Dec. 29, 1931.  A. C. MAY  1,839,110
METHOD OF AND DEVICE FOR MANUFACTURING HOLLOW EARTHENWARE ARTICLES
Filed Nov. 13, 1929
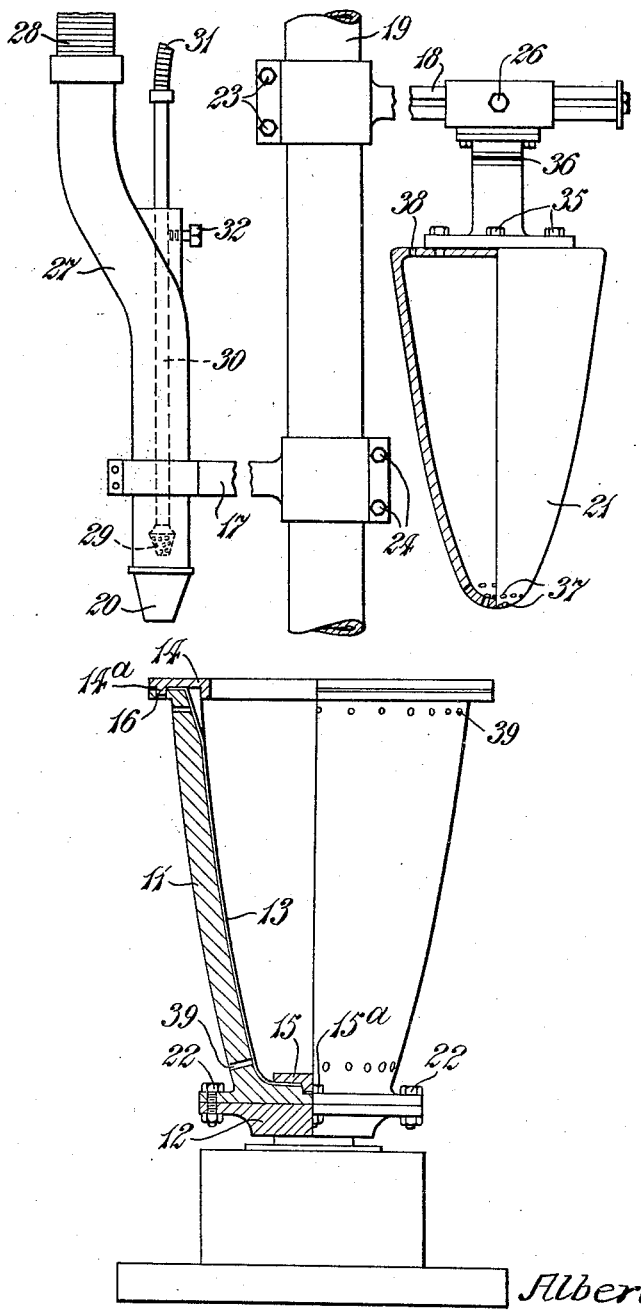
INVENTOR
Albert C. May
By William C. Linton
Attorney.

Patented Dec. 29, 1931

1,839,110

UNITED STATES PATENT OFFICE

ALBERT CHARLES MAY, OF NEW CROSS, ENGLAND

METHOD OF AND DEVICE FOR MANUFACTURING HOLLOW EARTHENWARE ARTICLES

Application filed November 13, 1929, Serial No. 406,927, and in Great Britain December 14, 1928.

This invention relates to hollow pottery, earthenware and other articles of a refractory nature, such as graphite and clay crucibles, pipes and tubes, containers for chemicals, and the like, and has for its object to provide an improved process of manufacture by which there may be produced better articles than have hitherto been obtainable and at a reduced cost. The invention is particularly applicable for the production of articles such as crucibles or tubes and the like the internal and external shape or configuration of which may be generated by the rotation of a straight or curved line about an axis of symmetry. The improved process may, however, be employed in the manufacture of articles which are not strictly symmetrical about a given axis.

According to a method at present in use raw argillaceous and other materials are first ground finely and mixed together thoroughly in a dry pulverulent state, and the mixture is then treated with water or other fluid in a mixing machine to form a plastic mass which is moulded to the required shape, the resulting product being finally allowed to dry or set and harden, with or without the application of heat.

According to the present invention, however, dry pulverulent or granular raw material is fed through a nozzle into a rotary mould, a fluid being incorporated with the raw material during its passage to, or as it leaves, the nozzle.

Preferably, the mould is closed at the bottom and is rotated about a central vertical axis, the nozzle extending downwardly into the mould substantially coaxially of the latter.

The raw material and fluid may be fed into the mould in predetermined quantities sufficient for the production of a required article, or, if desired, the supply may be checked by an operator when sufficient quantities have been delivered.

As the raw material and fluid are fed together into the rotary mould the resulting mixture builds up in a series of layers of substantially parabolic configuration around the inner wall and upon the bottom of the mould; and when the requisite thickness has been built up the nozzle is removed and there is inserted a suitably shaped plunger to press the deposited material firmly against the wall and bottom of the mould. Finally the product is removed from the mould for hardening in any known or usual manner.

Preferably, the speed at which the mould rotates is reduced while the plunger is operating or, if desired, the mould may be brought to rest while the plunger is operating. The plunger is mounted so that it may rotate freely about its own axis; it will therefore rotate at the same speed as the mould whilst it is operating.

In cases where cylindrical articles are to be produced the parabolic-shaped product from the rotary mould is placed whilst still plastic in a cylindrical mould into which a plunger or forming tool is inserted to produce the desired shape. Articles of asymmetrical configuration may be produced in a like manner.

An apparatus according to one form of the invention for use in the manufacture of earthenware crucibles for use for melting metal for casting is illustrated in part sectional elevation by the accompanying diagrammatic drawing.

As shown, a metal mould 11 is bolted to a rotary turntable 12 for rotation about its axis of symmetry. The mould 11 is shaped internally to correspond with the desired external configuration of the crucibles to be manufactured and is provided with a canvas lining 13 secured in position by means of a metal ring 14 and a plate 15 which are prevented from rotating relatively to the mould 11 by means of dowel pins, indicated at 14a and 15a project into apertures formed in a flange 16 at the top of the mould and into the bottom of the latter, respectively. The ring 14 is secured in position by means of clamps (not shown) and projects inwardly beyond the inside surface of the mould 11 for a distance equal to the desired thickness of the wall of a crucible to be produced and is readily removable from position so that it does not hinder the removal of a finished crucible for hardening.

Carried by arms 17 and 18 slidable up and down, and rotatable about an upright column 19 supported in any convenient manner, as by means of brackets, (not shown) extending from a wall or standard (not shown), are a nozzle 20 for feeding materials into the mould 11 and a hollow metal shaping plunger 21, respectively. The plunger 21 is slidable along the support arm 18 and the mould 11 is secured to the turntable 12 by means of bolts, as shown at 22. Clamping bolts 23, 23, and 24, 24 are provided for securing the support arms 17 and 18 in any desired position upon the column 19, a further bolt 26 being provided for securing the shaping plunger 21 in the desired position lengthwise of the support arm 18. For feeding argillaceous and other material, previously prepared and in the form of dry powder to the nozzle 20, a duct 27 extends upwardly therefrom and terminates in a flexible conduit, of which a portion is shown at 28, extending to a suitable hopper or other source of supply, not shown. In the apparatus illustrated, fluid is mixed with the dry powdered materials by means of a spraying nozzle 29 mounted co-axially within the lower part of the duct 27, a metal pipe 30 extending upwardly from said nozzle 29 through the wall of the duct 27 and terminating in a flexible pipe, part of which is indicated at 31, and which communicates with a suitable source of supply, not shown.

If desired, suitable measuring devices (not shown) for dry material and for liquid may be provided between the nozzle 20 and the supply of dry material and between the nozzle 29 and the supply of dry liquid, respectively. Also in the apparatus illustrated, a clamping bolt 32 is provided for securing the pipe 30 so that the nozzle 29 at the lower end thereof occupies the desired position lengthwise of the duct 27 and nozzle 20. If desired, however, the duct 27 may be straight in order that the dry material may follow a direct path to the nozzle 20 whilst the pipe 30 may be bent where it passes through the wall of the duct 27. The shaping plunger 21 is hollow and is secured removably to a face plate 34 by means of bolts 35, and said face plate is in turn connected with the support arm 18 through the medium of a ball or roller thrust bearing indicated at 36. The plunger 21 is provided with vent holes 37 and 38, whilst the mould 11 is provided also with a number of small apertures indicated at 39 to allow the escape of air from the material in the mould 11 when the plunger 21 is inserted, and to permit the admission of air to the interior of the shaped articles when the plunger 21 is withdrawn.

In use the feeding nozzle 20 is swung into position above the mould 11 and the latter is caused to rotate. A dry mixture of finely ground argillaceous materials is fed to the nozzle 20 through the conduit 28 and duct 27, whilst a liquid or steam, is fed to the spraying nozzle 29 through the pipes 31 and 30 for admixture with the dry materials as they pass to or through the nozzle 20. Just sufficient fluid is fed in this manner to cause said dry materials to bind together. The feeding of materials into the mould in this manner is continued until a sufficient quantity has arrived in the mould to produce the required article, the proportions of the latter depending upon the shape of the mould 11 and the speed at which it rotates. Thus, by a suitable adjustment of the speed of rotation, the thickness of the wall of the article produced may be modified throughout its height. Calculations involving such factors as rotary speed of mould, plasticity of deposited material, and rate of delivery of such material may be employed for determining the correct operation of the apparatus for the production of an article of given proportions. Thus, for any given mixture of materials fed into the mould the following formula may be employed in order to obtain the speed at which the mould should be rotated:—

$$W = \sqrt{\frac{2gH}{R^2}}$$

where $w$ equals radians per second.

$R$ equals maximum internal radius in feet of the article produced, $g$ equals the acceleration of gravity in feet per second and $H$ equals internal height in feet of the article produced. Thus, if the dimensions of the mould be as follows:

|  | Inches |
|---|---|
| Height | 13 |
| Maximum or top diameter | 9½ |
| Minimum or bottom diameter | 4¼ | the mould should be rotated at a speed of 229 revolutions per minute which will result in the production of a vessel the internal height of which will be 12 inches and the maximum or top internal diameter will be 8 inches. In practice, however, it is desirable in order to produce a vessel of these proportions to rotate the mould at about 200 to 210 revolutions per minute, while the materials are being deposited, thus producing a vessel of shallower form than that required, and inserting the plunger with sufficient pressure to mould the deposited material to the desired shape. By such operation, the material of the article produced will be denser or finer in grain throughout, and especially at the bottom (which is usually the weakest part) than would otherwise be the case. The mould is brought to rest while the plunger is operating and once the mould is stationary, the plunger is withdrawn and the shaped article is removed from the mould for hardening by any known method.

It is desirable that rotary motion should be imparted to the mould through variable gearing, not shown, such that changes of speed may be made during the feeding of raw material and without checking or hindering the rotary motion of the mould, and in order to allow a range of speeds suitable for the production of articles of a corresponding range of sizes and/or proportions.

It is to be observed that the spraying nozzle 29 may be positioned during the feeding operation above or within, or even below, the feeding nozzle 20.

By checking the delivery of raw materials or mixtures of such materials to the nozzle 20, and then supplying a different material or mixture whilst the mould 11 is still rotating, articles of a "ply" or multi-layer construction may be produced. It will be apparent that the process of the present invention makes it possible to produce a high-class article of very uniform grain or substance throughout which may be of extra strength at its lower part and that the cost of manufacture will be low because mixing of the raw material and depositing or shaping the resultant mixtures takes place simultaneously.

What I claim is:—

1. The method of manufacturing hollow articles of a refractory nature comprising, depositing a plastic mixture into a rotating mold, and pressing the plastic material deposited into the mold while the latter is still rotating to obtain the required final form of the article.

2. The method of manufacturing hollow articles of a refractory nature comprising, feeding a dry powdered raw material into a rotating mold, incorporating a fluid with the dry powdered raw material during its passage to the mold, and pressing the moist material discharged into the mold while the latter is still rotating to obtain the required final form of the article.

3. The method of manufacturing hollow articles of a refractory nature comprising, feeding a dry powdered raw material into a rotating mold, incorporating a fluid with the dry powdered raw material during its passage to the mold, rotating the mold at a speed sufficient to cause the moist material to build up therein, and pressing the moist material discharged into the mold while the latter is still rotating to obtain the required final form of the article.

4. The method of manufacturing hollow articles of a refractory nature comprising, feeding a dry powdered raw material into a rotating mold, incorporating a fluid with the dry powdered raw material during its passage to the mold, interrupting the discharge of the moist material in the mold, and subsequently introducing a shaping tool into the rotating mold to shape the moist material therein to the required final form of the article.

5. A device for the manufacture of hollow articles of a refractory nature comprising a mold having a closed bottom and adapted to be rotated about a central vertical axis, means for feeding a dry powdered material and a fluid to the mold and adapted to be supported to extend downwardly into the mold substantially coaxially of the latter, and a shaping tool adapted also to be inserted into the mold to press the material deposited therein firmly against the inner surface thereof, said tool being supported freely to rotate about a vertical axis.

6. A device for the manufacture of hollow articles of a refractory nature comprising a mold adapted to be rotated about a central vertical axis, means for feeding a dry powdered material and a fluid to the mold and supported to extend downwardly into the mold, and a shaping tool adapted to be inserted into the mold to press the material deposited therein firmly against the inner surface thereof, said tool being supported freely to rotate.

7. A device for the manufacture of hollow articles of a refractory nature comprising a mold having a closed bottom and adapted to be rotated about a vertical axis, means for feeding a dry powdered material and a fluid to the mold and adapted to be supported to extend downwardly into the mold substantially coaxially with the latter, a shaping tool adapted also to be inserted into the mold to press the material deposited therein firmly against the inner surface thereof, said shaping tool being supported freely to rotate about a central vertical axis, and means formed in said mold and shaping tool to allow the escape of gas from the material in the mold when the shaping tool is inserted and to permit the admission of gas to the interior of the shaped article when the shaping tool is withdrawn.

8. A device for the manufacture of hollow articles of a refractory nature comprising a mold adapted to be rotated about a vertical axis, means for feeding a dry powdered material and a fluid to the mold and supported to extend downwardly into the mold substantially coaxially of the latter, a shaping tool adapted also to be inserted into the mold to press the material deposited therein firmly against the inner surface thereof, said shaping tool being supported freely to rotate about a vertical axis, and means for adjusting said feeding means and shaping tool with respect to the mold.

In witness whereof I have hereunto signed my name.

ALBERT CHARLES MAY.